United States Patent
Max et al.

(10) Patent No.: US 10,983,529 B2
(45) Date of Patent: Apr. 20, 2021

(54) METHOD AND SYSTEM FOR PROVIDING DATA FOR A FIRST AND SECOND TRAJECTORY

(71) Applicant: VOLKSWAGEN AG, Wolfsburg (DE)

(72) Inventors: Stephan Max, Gifhorn (DE); Kristian Weiß, Berlin (DE); Sascha Bauer, Berlin (DE); Sönke Freter, Berlin (DE); Björn Richter, Berlin (DE)

(73) Assignee: Volkswagen AG

( * ) Notice: Subject to any disclaimer, the term of this patent is extended or adjusted under 35 U.S.C. 154(b) by 286 days.

(21) Appl. No.: 15/809,685

(22) Filed: Nov. 10, 2017

(65) Prior Publication Data
US 2018/0136666 A1     May 17, 2018

(30) Foreign Application Priority Data
Nov. 14, 2016    (DE) .................... 10 2016 222 259.7

(51) Int. Cl.
*G05D 1/02*     (2020.01)
*G08G 1/01*     (2006.01)
*G01C 21/32*    (2006.01)

(52) U.S. Cl.
CPC .......... *G05D 1/0274* (2013.01); *G01C 21/32* (2013.01); *G08G 1/0112* (2013.01); *G08G 1/0129* (2013.01)

(58) Field of Classification Search
CPC .............. B60W 30/06; B60W 30/095; B60W 30/0953; B60W 30/0956; B62D 15/0285; G01C 21/00; G01C 21/26; G01C 21/28; G01C 21/30; G01C 21/32; G05D 1/00; G05D 1/02; G05D 1/021; G05D 1/0268; G05D 1/0274; G08G 1/00; G08G 1/01;
(Continued)

(56) References Cited

U.S. PATENT DOCUMENTS

2018/0024562 A1*    1/2018   Bellaiche ................ G01S 19/48
                                                                701/26

FOREIGN PATENT DOCUMENTS

DE        10030932 A1    1/2002
DE        10346846 A1    4/2005
(Continued)

OTHER PUBLICATIONS

Search Report for German Patent Application No. 10 2016 222 259.7, dated Jul. 17, 2017.

*Primary Examiner* — Charles J Han
(74) *Attorney, Agent, or Firm* — Barnes & Thornburg LLP

(57) ABSTRACT

A method for providing data for a first trajectory and a second trajectory where trajectory data relating to the first and second trajectories are captured. Trajectory database data are generated for the first and second trajectories based on the captured trajectory data, and the trajectory database data are stored in a non-volatile way. A trajectory comparison of the first and second trajectories is carried out based on the captured trajectory data, and at least one common section is determined during the trajectory comparison based on the first and second trajectories. The common section is stored as a common data structure for the first and second trajectories. Also disclosed is a system for providing data for a first trajectory and a second trajectory having a trajectory capture unit, a computing unit, and a memory unit.

22 Claims, 3 Drawing Sheets

(58) Field of Classification Search
CPC .. G08G 1/0104; G08G 1/0108; G08G 1/0112; G08G 1/0125; G08G 1/0129; G08G 1/168
See application file for complete search history.

(56) References Cited

FOREIGN PATENT DOCUMENTS

| | | | |
|---|---|---|---|
| JP | 2014189097 | A | 10/2014 |
| JP | 2015214223 | A | 12/2015 |
| KR | 1020040031576 | A | 4/2004 |

\* cited by examiner

METHOD AND SYSTEM FOR PROVIDING DATA FOR A FIRST AND SECOND TRAJECTORY

PRIORITY CLAIM

This patent application claims priority to German Patent Application No. 10 2016 222 259.7, filed 14 Nov. 2016, the disclosure of which is incorporated herein by reference in its entirety.

SUMMARY

Illustrative embodiments relate to a method for providing data for a first and a second trajectory, in which trajectory data relating to the first and second trajectories are captured. Trajectory database data are generated for the first and second trajectories on the basis of the captured trajectory data, and the trajectory database data are stored in a non-volatile manner. In this case, a trajectory comparison of the first and second trajectories is carried out on the basis of the captured trajectory data, and at least one common section is determined during the trajectory comparison on the basis of the first and second trajectories. The illustrative embodiments also relate to a system for providing data for a first and a second trajectory, having a trajectory capture unit which can be used to capture trajectory data relating to the first and second trajectories. The system also comprises a computing unit which can be used to generate trajectory database data for the first and second trajectories on the basis of the captured trajectory data, and a memory unit which can be used to store the trajectory database data in a non-volatile manner. In this case, a comparison unit can be used to carry out a trajectory comparison of the first and second trajectories on the basis of the captured trajectory data, wherein at least one common section can be determined during the trajectory comparison on the basis of the first and second trajectories.

BRIEF DESCRIPTION OF THE DRAWINGS

The disclosed embodiments are now explained with reference to the drawings.

DETAILED DESCRIPTION

Figure 1:
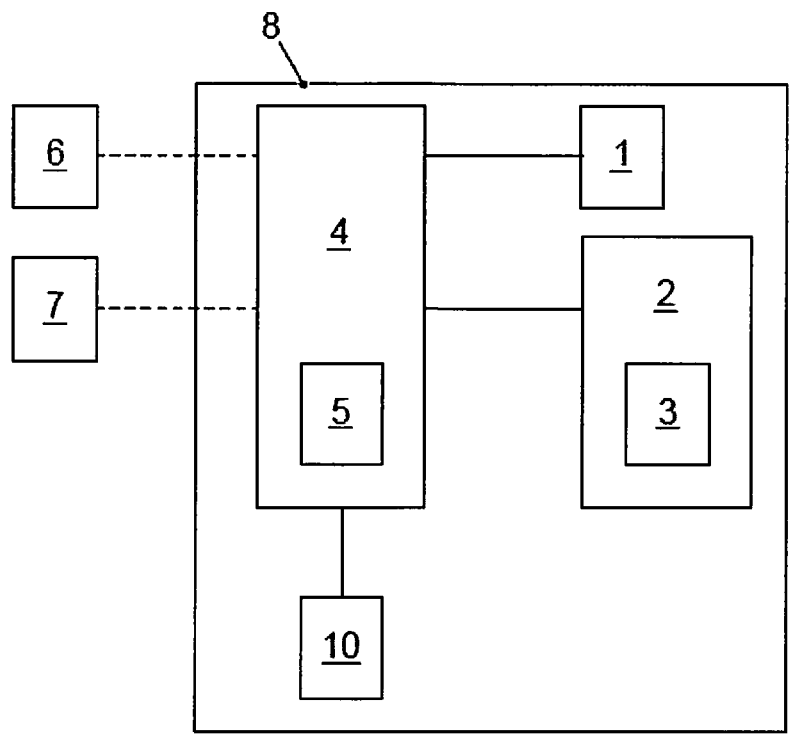
FIG. 1 shows an exemplary embodiment of the disclosed system.

Electronic devices, in particular in the field of automotive technology, increasingly provide functions which enable movement or navigation right up to partially or completely automatically controlled locomotion. In this case, various applications presuppose that particular trajectories are provided in a manner preprocessed in a favorable way. Such trajectories can be used, for instance, for output to a user, for operating a control apparatus or as the basis for calculating a new trajectory.

For example, in the case of the parking assistant described in JP 2015 214223 A, an obstacle is detected and a parking trajectory is adapted, with the result that the path of the vehicle does not overlap the obstacle. In this case, a display is also provided, in which the corrected trajectory is displayed in an overlaid manner.

Furthermore, JP 2014 189097 describes an apparatus for assisting with a parking operation, data relating to the environment of the vehicle being captured, an available parking position being detected and a parking path being calculated, the driving on prohibited regions being avoided. In this case, the trajectory is displayed in an overlaid manner with respect to a view from above.

KR 1020040031576 A finally describes an apparatus for assisting with parking, an image of the parking space being output. On the basis of the steering lock, a direction of the vehicle is determined and the image of the parking space is output in an overlaid manner.

DE 103 46 846 A1 describes a method for providing current merged situation data, in which environmental sensors of a vehicle capture environmental data. These environmental data are merged with digital road network data. In this case, the road network data may be corrected or supplemented.

DE 100 30 932 A1 proposes a method for generating, checking, supplementing and/or updating road map data. While a vehicle is driving on a trajectory, a position determination system periodically captures and stores positions of the vehicle. The position data are transmitted to a database and are centrally evaluated there. A multiplicity of trajectories can be combined and can be statistically evaluated using a digitized road map. On the basis of the data obtained in this manner, different items of information are determined to supplement and/or update the road map. The current version of the road map can then be made available to users.

In mobile systems, the difficulty often arises of only limited computing and storage capacities being available, in which case an increase in the existing capacities is associated with high costs, inter alia. Therefore, data relating to a trajectory must be provided such that as little memory as possible and low bandwidths are needed to transmit data, for example.

The disclosed embodiments provide a method and a system of the type mentioned at the outset which allow use in a resource-saving and simple manner.

Disclosed embodiments provide a method and a system.

The disclosed method is characterized in that, when storing the trajectory database data, the common section is stored as a common data structure for the first and second trajectories. Furthermore, driving data are generated for at least the first or second trajectory on the basis of the trajectory database data, and a vehicle is automatically controlled along the first or second trajectory on the basis of the driving data.

As a result, the memory required can be reduced and the data for the first and second trajectories can be provided in a simple manner.

The trajectory data are captured in a manner known per se, for example, by capturing sensor data by a trajectory capture unit while driving on the trajectories, for instance, by vehicles, or by capturing the trajectory data on the basis of a database. In this case, the trajectory data may comprise various items of information which characterize the trajectories. The trajectory data are suitable for making it possible to control a mobile unit, for example, a vehicle, along the relevant trajectory.

In at least one embodiment of the disclosed method, the trajectory data relating to the first and second trajectories each comprise an organized sequence of positions. In this case, the trajectory data relating to the first and second trajectories may comprise at least partially different positions. As a result, the spatial course of the trajectories is defined on the basis of the positions arranged in succession along the trajectory. In this case, the positions may be captured when capturing the trajectory data, in which case an interpolation can also be carried out on the basis of captured positions to determine further positions.

Furthermore, each of the positions may be assigned a direction, in particular a direction of movement, the direction of movement being able to point from the respective position to the respective subsequently arranged position.

In another disclosed embodiment, the positions of the trajectory data relative to orientation points in an environment of the first and/or second trajectory are captured. As a result, the positions along the trajectories are defined on the basis of the position relative to one or more orientation points in the environment. The trajectory data for the individual positions along the trajectories each comprise positions relative to one or more of the orientation points.

"Orientation points" in the sense of the disclosure are characteristic features of the environment, for instance, landmarks, which are arranged within a visual range or detection area of a sensor at the respective position of the trajectory. At least one position can be assigned to an orientation point. The characteristic features are designed in such a manner that their positions remain substantially constant within a particular interval of time or the orientation points can at least be recognized. For example, the information displayed on a display apparatus may change, whereas the display apparatus itself can be permanently identified.

The orientation points are determined on the basis of features of a traffic infrastructure, for example, on the basis of posts, road markings, traffic signs, light signal systems, display areas, road edges, properties of a road surface and/or traffic structures. Furthermore, the orientation points may be identified, for example, on the basis of structural features, for instance, a fence or the edges and corners of a structure, or on the basis of properties of vegetation, for example, a tree trunk. In addition, the orientation points may comprise geographical properties of the environment of the trajectory, for example, a road course or an elevation profile of the environment.

Orientation points may be categorized in this case, for instance, on the basis of their extent properties. Punctiform, linear or flat orientation points or orientation points as polylines may be distinguished, in which case this list of optional categories should not be understood as being conclusive. A position can be respectively assigned to the orientation points of different categories and/or an item of information relating to the position relative to the orientation point can be determined by observing an orientation point. For example, an angle and/or a distance with respect to the position of the orientation point can be determined when observing an orientation point, for instance, a post.

Further characteristic features of the environment can also be used as orientation points, for example, features captured in a manner known per se on the basis of image processing. In this case, regions with a characteristic contrast, color and/or brightness transitions or similar features may be taken into account, for instance. Image processing methods, such as high-pass filters, low-pass filters and/or a Fourier analysis, can be used, for example, to capture such features. Profiles of particular characteristic properties of captured image data can be determined in this case, local or global maxima being able to be determined and evaluated, for instance.

In this case, the orientation points can be stored in a digital localization map which comprises information relating to positions of the orientation points relative to one another and/or relative to positions of the respective trajectory.

In one development, sensor data are captured when capturing the trajectory data relating to the first and second trajectories, and the positions are determined on the basis of the captured sensor data relative to the orientation points. This makes it possible to use simple and accurate localization methods.

In this case, the positions of the orientation points can be captured and determined on the basis of data from sensors which are known per se. For example, optical sensors can be used for the capture, for instance, a camera for capturing image data, a stereo camera, a time-of-flight camera or a laser scanner as well as ultrasonic and/or radar sensors. In this case, the sensors have a particular detection region, that is to say an area relative to the sensors within which data can be captured.

It is also possible to use further data, for example, operational data relating to a mobile unit which moves along the trajectory, for example, a speed, a direction, a steering angle and/or an inclination of a vehicle. The detection of the orientation points and the determination of the positions of the trajectory relative to the orientation points can then be carried out, for example, on the basis of image processing and/or other methods. The organized sequence of the positions of a trajectory results from the temporal sequence of a plurality of observations of an orientation point, in which case a position relative to the orientation point is respectively determined on the basis of the observations.

Furthermore, the trajectory data relating to the first and second trajectories can be captured during a movement of a mobile unit, in particular a vehicle, with sensors along the first and second trajectories. As a result, the captured trajectory data can be respectively assigned to a position along a trajectory and to a capture time.

Alternatively or additionally, the trajectory data may be captured on the basis of a user input and/or provided in another manner. Alternatively or additionally, the positions of the trajectories can be captured as global positions on the basis of further methods, for example, on the basis of a navigation satellite system.

In at least one disclosed embodiment, the first and second trajectories have substantially the same target position. That is to say, at least one end of the trajectories respectively substantially corresponds to the common target position. In this case, the term "target position" is not necessarily understood as meaning that a movement along the first or second trajectory leads to the target position, but rather movements along the trajectories can also be carried out in the opposite direction, that is to say starting from the common target position.

The target position of the first and second trajectories is a parking space in this case. As a result, the method can be used to provide data for trajectories for reaching the parking space, for example, for driving into a parking space and driving out of a parking space.

In this case, the trajectories can be captured, for example, during a function for the trained parking of a vehicle. In this case, a plurality of trajectories for a parking space can be captured and stored, in particular if a plurality of entry and exit trajectories belong to a parking space. This can be due to the fact that, for example, a parking space can be approached from different sides or, for instance, entry and exit trajectories differ from one another on account of the position of the parking space.

In this case, a determination of the target position for at least one trajectory can also be simplified if specifically an operation of driving into a parking space is first of all carried out and an operation of driving out of a parking space is then carried out. In this case, the end position of the operation of driving into a parking space and the starting position of the operation of driving out of a parking space necessarily correspond. It is therefore not necessary to redetermine the starting position when driving out of a parking space, for example, with the result that corresponding uncertainties of a localization method used need not be accepted.

Furthermore, odometry methods which are known per se can be used to capture the trajectories and determine the common section. In this case, movement data are captured, in particular data relating to a direction of movement and a speed, and the first and/or second trajectory is/are determined on the basis of the movement data. The movement data can be captured together with the trajectory data relating to the first and/or second trajectory. The movement data can also be taken into account to carry out the trajectory comparison of the first and second trajectories. For example, the position of a trajectory capture unit may be determined on the basis of the movement data. Alternatively or additionally, the positions included in the trajectory data can be determined on the basis of the movement data and/or the determination of the positions can be optimized by taking into account the movement data.

In another disclosed embodiment, the first and second trajectories have different target positions, for example, different parking spaces. The disclosed method now allows a common section of the two trajectories to be determined and the trajectory database data to be generated in an efficient manner.

The disclosed method also provides for a trajectory comparison of the first and second trajectories to be carried out. In this case, at least one common section of the two trajectories is determined. In this case, a "common section" is understood as meaning a section of the trajectories, in particular a subset of successive positions along the trajectories.

In at least one disclosed embodiment of the method, during the trajectory comparison, trajectory parts are determined for the first and second trajectories. A deviation is respectively determined for the trajectory parts of the first and second trajectories, and the trajectory parts are assigned to the common section on the basis of the determined deviation and a deviation threshold value. This makes it possible to determine which sections of the two trajectories correspond to one another.

Within the common section, the first and second trajectories do not differ or differ by less than a particular deviation. In this case, a deviation of the course of the two trajectories is determined for particular sections and/or positions of the trajectories and is compared with the deviation threshold value.

In this case, trajectory parts of the two trajectories may first of all be determined, individual sections of the trajectories already being combined, for instance, to form the trajectory parts as units, for example, to accelerate the processing.

The disclosed method can be carried out iteratively if trajectory data are available for more than two trajectories, a trajectory comparison in pairs respectively being able to be carried out for the method, for instance, to determine the respectively common section and to store the trajectory database data in an efficient manner.

In another disclosed embodiment, the deviation comprises a lateral distance and/or a direction difference between the trajectory parts of the first and second trajectories. This makes it possible to take into account different criteria individually or in combination.

The deviation can be determined in this case, in particular, according to methods which are known per se, further features alternatively or additionally being able to be used to characterize a deviation of two sections of trajectories.

In this case, a distance, in particular a lateral distance or transverse offset, between the first and second trajectories can be determined, for instance. The distance between individual positions along the trajectories can be determined in this case. The distance can be compared with a threshold value which can be selected as a parameter and this criterion can be assessed as satisfied if the threshold value is undershot, that is to say if the distance is short enough. A tolerance band can be defined in this case, sections of the trajectories inside the tolerance band, that is to say below a particular maximum distance from one another, being assessed as belonging to a common section.

Furthermore, it is possible to determine a difference in an orientation of the trajectories with respect to one another, in particular a difference angle. For this purpose, a tangent having an angle can be respectively assigned to positions of the trajectories, for example. It is also possible to determine here whether the difference in the orientation of sections of the first and second trajectories undershoots a threshold which can be selected as a parameter to assess this criterion as satisfied.

It is also possible to take into account whether the first and second trajectories are on the same level, for example, to avoid sections of trajectories on different levels of a parking garage being assessed as common sections. This is important when parking spaces are arranged above one another and similar forms of the orientation points in the environment of trajectories for driving into a parking space and driving out of a parking space can be assumed. Alternatively or additionally, it is also possible to determine whether further items of information relating to a localization of the trajectories correspond or differ from one another by less than a particular threshold value.

It is also possible to take into account whether the regions within which trajectory data are captured in the sections of the first and second trajectories, for instance, by a camera for capturing image data or by a scanner, have a certain overlap, the overlap of the detection regions being able to be compared with a threshold value. This makes it possible to ensure that it is possible to adequately capture relevant orientation points when capturing trajectory data for both trajectories.

Further criteria may also be defined. Sections of the first and second trajectories may be identified as a common section when one or more of the criteria are satisfied. It is assumed in the method that the two trajectories meet the requirements for identification as a common section at least in one section.

In the case of a parking space for example, it can typically be assumed that the trajectories for driving into a parking space and driving out of a parking space correspond at least in one common section, for instance, if the vehicle drives forward into a parking space and reverses from the parking space.

According to the disclosure, trajectory database data are generated on the basis of the captured trajectory data and are stored in a non-volatile manner. In this case, the storage can be carried out locally, for instance, by a mobile unit or in a vehicle, or using an external device, for example, a server. For example, the trajectory database data may be stored by a server in a parking garage and can be transmitted, if necessary, to a vehicle which is intended to approach a particular parking space. This makes it possible to ensure central management of the trajectory database data to make it possible to provide relevant information on the basis of the trajectory database data.

In this case, the disclosed method allows efficient use of the memory by virtue of the trajectory database data for a common section being able to be combined. In this case, the storage is carried out in such a manner that a common data structure is formed, which data structure comprises the data relating to the common section and is jointly used for the first and second trajectories. The common data structure is stored only once in the data memory in this case, whereas data relating to further sections which differ for the first and second trajectories are respectively stored per se. This makes it possible to reduce the required storage space and/or the volume of data which need to be transmitted from an external device to a vehicle, for example.

To generate the common data structure, the trajectory data for the first or second trajectory, for example, can be used for the common section, that is to say the trajectory data captured during a first or a second operation of driving on the common section, for example. In this case, the trajectory data captured for one of the trajectories can be discarded. It is also possible to merge the trajectory data, for example, to ensure, on the basis of the captured trajectory data for both trajectories, that the common data structure comprises information which is as comprehensive and/or as current as possible. In this manner, positions relative to new orientation points can be added, for example, an omission of orientation points can be identified and/or a position relative to an orientation point can be updated.

In one development, update data are generated on the basis of the trajectory database data, and a trajectory database is updated on the basis of the update data. In this case, the trajectory database comprises further trajectory database data. This makes it possible to implement a simple update function for the trajectory database.

In this case, a trajectory database may be locally stored, for example, in the memory of a mobile unit, for instance, a vehicle, and/or may be provided by an external device, for instance, an external server. The trajectory database comprises trajectory database data relating to different trajectories.

The disclosed method allows database trajectory data to be updated here in a simple, fast and efficient manner. In this case, use can be made of the fact that a change in a common section, which is stored as a common data structure for at least two trajectories, has effects on both trajectories. If it is detected, for example, that a trajectory can be optimized in the region of a common section, for example, on account of a structural change which makes it necessary to adapt the trajectory in this section, the database trajectory data for the common section can be adapted, this adaptation having an effect on all trajectories which include this common section.

According to the disclosure, driving data are generated for at least the first or second trajectory on the basis of the trajectory database data. A vehicle is automatically controlled along the first or second trajectory on the basis of the driving data. This makes it possible to carry out partially or completely automatic control on the basis of the stored trajectory database data.

The driving data comprise information which can be used by a device for partially or completely automatically controlling the movement of a mobile unit, in particular a vehicle. For example, data relating to the course of a trajectory driven on the first or second trajectory, may be included; data relating to speeds, steering angles and/or further control parameters may also be included, for instance.

In this case, the driving data are generated in a manner known per se, in which case a current position of the mobile unit is assumed. On the basis of the first or second trajectory along which the automatic control is intended to be carried out, the driving data are configured to control a movement of the mobile unit in such a manner that positions along the trajectory are reached. In this case, methods which are known per se can also be used to determine the trajectories along which the control is intended to be carried out.

The partially or completely automatic control can be carried out by a driver assistance system, for example. A driver assistance system is understood as meaning a device of a vehicle which assists the driver when driving the vehicle. Driver assistance systems may therefore comprise both pure information systems which assist the driver and devices which automatically influence the locomotion of the vehicle, in which case they can control the function of such devices or can intervene in the function.

Without the automatic control, the driver directly influences the movement of the vehicle. At best, signals or movements of operating elements actuated by the driver, for instance, the pedals, the gear lever or the steering wheel, are transmitted to corresponding devices of the vehicle which influence the locomotion of the vehicle. Such locomotion of the vehicle corresponds to the lowest degree of automation. In the case of a higher degree of automation, the system partially automatically intervenes in the devices which are used for the locomotion of the vehicle. For example, the system intervenes in the steering of the vehicle or in the positive or negative acceleration. In the case of an even higher degree of automation, the system intervenes in devices of the vehicle to such an extent that particular types of locomotion of the vehicle, for example, driving straight ahead or a drive along a clearly predefined trajectory, can be automatically carried out. In the case of the highest degree of automation, routes from a navigation system can be driven substantially automatically. In this case, although the driver can increasingly cede control over the vehicle guidance with the choice of a higher degree of automation, he can typically immediately regain this control again by active steering or by actuating the pedals.

In another disclosed embodiment, sensor data are captured during automatic control, and current environmental data are determined on the basis of the sensor data. The automatic control is carried out on the basis of a comparison between the determined current environmental data and the trajectory database data. The current environmental data determined on the basis of the captured sensor data comprise positions relative to orientation points. This makes it possible to carry out the automatic control in a simple manner on the basis of the database trajectory data.

In this case, the sensor data can be captured in a manner known per se, in particular in a similar manner to the capture of the trajectory data in the disclosed method.

For example, it is possible to use a sensor of the type explained above. For example, it is possible to capture image data which are used to determine the environmental data, in particular with positions relative to orientation points.

In another disclosed embodiment, an item of localization information is captured, and the driving data are generated either for the first or second trajectory on the basis of the localization information. This makes it possible to identify the relevant trajectories.

For example, the localization information may comprise a position relative to the first or second trajectory. In this case, it is possible to capture, for instance, whether the current position of the unit to be controlled, in particular a vehicle, undershoots a particular distance to one of the trajectories. For example, provision may be made for a particularly close trajectory to be driven on, if the vehicle is at a particular position of a trajectory. Furthermore, a distance from a target position of a trajectory, in particular a parking space, can be determined on the basis of the localization information, for example. The localization information may also comprise a position relative to an absolute coordinate system, for example, on the basis of GPS coordinates, or an identification number of a position, for instance, a parking space.

For example, a position of a parking space at the end of a trajectory can be determined, the driving data being able to be determined in this case in such a manner that a parking space which is as close as possible and/or can be reached easily is approached.

The localization information can be provided in addition to the trajectory database data, for example, by an external unit, for instance, a server which manages parking spaces in a parking garage and allocates them to particular vehicles.

In one development, the trajectory database data are stored by an external server, and the driving data are generated by the external server; furthermore, the external server can provide control signals for automatically controlling the vehicle. The driving data are retrieved from the external server. This makes it possible to centrally manage the trajectory database data and to centrally generate the driving data. As a result, central management of the parking spaces in a parking garage can be provided, for example, in which case partially or completely automatic control of vehicles to the parking spaces on the basis of the driving data is also enabled.

The disclosed system of the type mentioned at the outset is characterized in that, when storing the trajectory database data, the common section can be stored as a common data structure for the first and second trajectories. Furthermore, driving data can be generated for at least the first or second trajectory on the basis of the trajectory database data, and a vehicle can be automatically controlled along the first or second trajectory on the basis of the driving data.

The disclosed system is designed to implement the method described above. The system therefore has the same benefits as the disclosed method.

In at least one embodiment of the disclosed system, the trajectory capture unit can be used to capture positions relative to orientation points in an environment of the first and/or second trajectory. This makes it possible to capture a trajectory on the basis of positions relative to the orientation points.

In another disclosed embodiment, the memory unit is included in an external server. This makes it possible to centrally manage the data for the trajectories, in particular on the basis of a trajectory database.

An exemplary embodiment of the system is explained with reference to FIG. 1.

A vehicle 8 comprises a trajectory capture unit 1, a camera 1 in the exemplary embodiment. Alternatively or additionally, the trajectory capture unit 1 may include other sensors, for example, a stereo camera, a time-of-flight camera, a laser scanner, a radar scanner, an ultrasonic sensor and/or a detector for a navigation satellite system.

The vehicle 8 also comprises a computing unit 2 which, in the exemplary embodiment, comprises a comparison unit 3. The trajectory capture unit 1 and the computing unit 2 are coupled to a control unit 4 which in turn comprises a memory unit 5.

The control unit 4 is also coupled to automatic controller 10 for automatically controlling the vehicle 8. In the exemplary embodiment, the automatic controller 10 for automatically controlling the vehicle 8 comprise a driver assistance system which can be used to control the vehicle 8 in a partially or completely automatic manner. In this case, devices of the vehicle 8 are actuated, which devices are used to carry out longitudinal and lateral control, that is to say can be used to control the speed and/or direction of the vehicle movement.

In addition, it is possible to establish disconnectable data connections from the control unit 4 to a localization unit 6 and to an external server 7.

Figure 2:
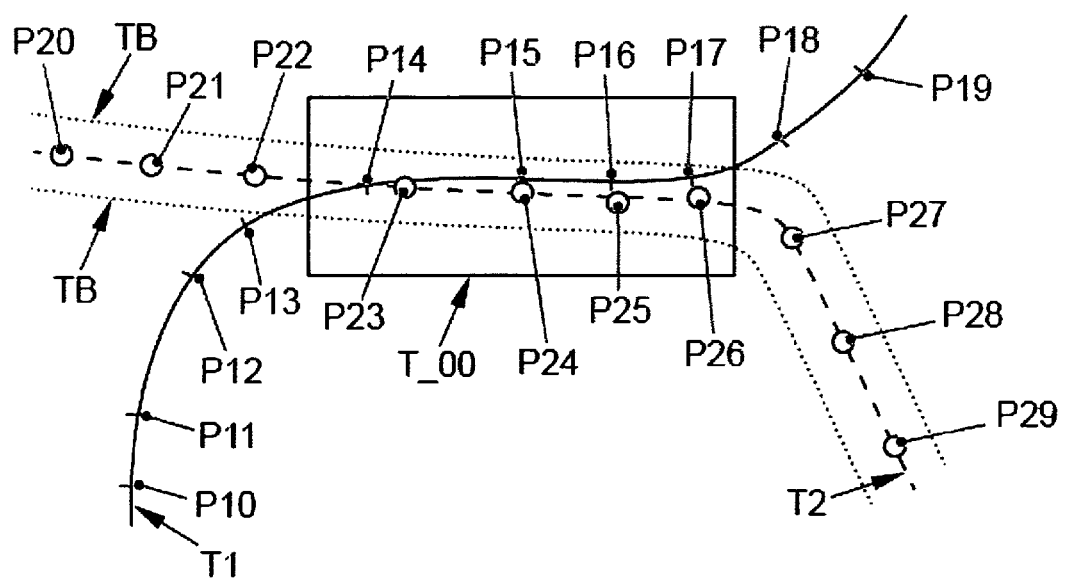
FIG. 2 shows an exemplary embodiment of the disclosed method.

An exemplary embodiment of the method is explained with reference to FIG. 2. In this case, the exemplary embodiment of the system, as explained with reference to FIG. 1, is used as a starting point and is described in more detail with reference to the method.

In the exemplary embodiment, the vehicle 8 moves along a first trajectory T1 and a second trajectory T2. In this case, provision is made for the vehicle 8 to drive on the first trajectory T1 at a first time and to drive on the second trajectory T2 at a second time. A multiplicity of positions P10 to P19, P20 to P29 are respectively defined along the trajectories T1, T2. In further exemplary embodiments, provision may be made for the trajectory data to be captured by different vehicles which drive on the trajectories T1, T2 independently of one another.

The camera 1 captures trajectory data relating to the trajectories T1, T2, provision being made for the capture to be respectively carried out at the positions P10 to P19, P20 to P29 of the trajectories T1, T2. The trajectory data comprise environmental data; these are image data relating to the environment of the trajectories T1, T2 in the exemplary embodiment. Orientation points are identified in a manner known per se on the basis of the image data and positions relative to the orientation points are determined, a distance and/or a direction relative to each of the orientation points being determined. The trajectory data are used to determine which relative positions with respect to which orientation points are respectively assigned to the positions P10 to P19 of the first trajectory T1 and to the positions P20 to P29 of the second trajectory T2.

In a further exemplary embodiment, uncertainties are determined together with the relative positions for the orientation points, for example, a variance and/or confidence of the determined values, in which case a localization quality can be determined.

Provision may also be made for further localization features of the environment of the trajectories T1, T2 to be captured as an alternative or in addition to the positions relative to the orientation points. In further exemplary embodiments, the trajectory data and the positions relative to the orientation points are alternatively or additionally captured on the basis of data from other sensors, in particular on the basis of other detection principles. Provision may also be made for absolute positions to be determined on the basis of a navigation satellite system, for example, relative to a global coordinate system. In a further exemplary embodiment, provision may also be made for the trajectory data to be alternatively or additionally captured on the basis of a user input, for example, by virtue of a user manually inputting the course of a trajectory T1, T2.

In the exemplary embodiment, the trajectories T1, T2 have a common section T_00 in which the trajectories T1, T2 largely correspond. This is the case, for example, if the trajectories T1, T2 run in the same lane of a road in the region of the common section T_00.

In the method, the comparison unit 3 carries out a trajectory comparison and determines which parts of the first T1 and second T2 trajectories belong to the common section T_00. For this purpose, the trajectories T1, T2 are subdivided into trajectory parts in a first operation, the exemplary embodiment providing for the trajectory parts to each extend from a particular position to the respective next position P10 to P19, P20 to P29. In further exemplary embodiments, the trajectory parts of the trajectories T1, T2 can be determined in another manner.

For these trajectory parts, a start and an end position and an orientation of a straight line defined thereby are respectively determined. A deviation is respectively determined for the trajectory parts of the first T1 and second T2 trajectories. In this case, the deviation comprises a quantitative measure of the lateral distance and a difference angle between two trajectory parts of different trajectories T1, T2. In this case, the difference angle is defined as the angle enclosed by the straight lines which are defined by the start and end positions of the trajectory parts.

In further exemplary embodiments, the determined deviation may alternatively or additionally include further parameters.

The deviation of the trajectory parts compared in pairs from one another is compared with a deviation threshold value and the trajectory parts are identified as belonging to the common section T_00 if the deviation undershoots the threshold value. The deviation threshold value is indicated in FIG. 2 by limits of a tolerance band TB which runs parallel to the second trajectory T2. In this case, the tolerance band TB indicates how large the lateral distance between the trajectories T1, T2 may be to define a common section T_00. That is to say, the width of the tolerance band TB can be changed by selecting the deviation threshold value, in particular with regard to the lateral distance.

The exemplary embodiment also provides additional criteria which must be satisfied so that two trajectory parts are assessed as belonging to a common section T_00: both trajectories T1, T2 must be on the same level in the common section T_00, that is to say, for example, a parallel course of the trajectories T1, T2 on different levels of a parking garage or on and under a bridge is not assessed as a common section T_00. It is also determined whether the visual ranges of the camera 1 have an overlap when capturing the trajectory data for the trajectory parts, and the size of the overlap is compared with a threshold value, in which case there must be at least a particular overlap so that the trajectory parts are assessed as belonging to a common section T_00. In further exemplary embodiments, the criteria can be taken into account and combined in different ways, in which case further criteria can be alternatively or additionally used.

In the further course of the method, the computing unit 2 generates trajectory database data on the basis of the captured trajectory data and stores them in a non-volatile manner. The trajectory database data are suitable for being stored in a trajectory database. In this case, data relating to a trajectory T1, T2 can be captured on the basis of the trajectory database, for example, on the basis of a search function or a database query.

When generating the trajectory database data, data for the common section T_00 are stored as a common data structure in the method. That is to say, the data for the common section T_00 are stored only once in the non-volatile memory. If data relating to a trajectory T1, T2 are now retrieved, the data relating to the common section T_00 are combined with further data, thus resulting in a complete set of data relating to the respective trajectory T1, T2.

The common data structure, in which the trajectory database data for the common section T_00 are stored, is generated in this case on the basis of the trajectory data captured for the first T1 and second T2 trajectories. The exemplary embodiment provides for the captured trajectory data to be merged. During merging, positions relative to orientation points can be combined to form a common data set, for example. Furthermore, further localization features of the trajectory data captured for the trajectories T1, T2 can also be combined. Localization features can be taken into account or rejected in this case on the basis of an iterative method until a particular localization quality is achieved, which quality can be set as a parameter, for example. In this case, provision may be made for averaging and/or other processing to be carried out if a plurality of positions relative to a particular orientation point have been captured for the first T1 and second T2 trajectories. In further exemplary embodiments, provision may be made for the trajectory database data for the common section T_00 to be generated on the basis of the trajectory data captured for one of the trajectories T1, T2, in which case the trajectory data with a more recent date and/or of higher quality, in particular of higher localization quality, are used, for example, while the other trajectory data are discarded.

The exemplary embodiment provides for the trajectory database data to be stored by the memory unit 5, a local trajectory database being stored here. Trajectory database data for those trajectories T1, T2 which are driven on frequently by the vehicle 8 or have been driven on within a particular period are stored here. The exemplary embodiment also provides for trajectory database data to be transmitted to the external server 7, the external server 7 managing a global trajectory database which comprises trajectory database data for a multiplicity of trajectories T1, T2, which data are provided by different vehicles and/or devices, for example.

To keep the local and/or global trajectory database up-to-date, update data are generated on the basis of the trajectory database data. The trajectory database data stored in the trajectory database can be updated on the basis of these update data. For example, trajectory data may be merged in this case, for instance, to determine updated positions relative to orientation points, to add new orientation points and/or to remove information relating to orientation points which no longer exist. Trajectory data can also be replaced, in which case more recent or higher-quality trajectory data are stored, for example, whereas the previously available trajectory data are discarded.

The exemplary embodiment also provides for the vehicle 8 to be controlled along a trajectory T1, T2 in a partially or completely automatic manner. To operate the automatic controller 10 for automatically controlling the vehicle 8, driving data are generated and comprise the information needed to drive on the trajectory T1, T2. For example, information relating to a course of the trajectory T1, T2, speed specifications and/or road properties are included in this case. The vehicle 8 is controlled in this case in a partially automatic manner if, in addition to intervention by a vehicle driver, further control measures are automatically carried out or in a completely automatic manner if the vehicle 8 is controlled along a trajectory T1, T2 without intervention by the vehicle driver.

Sensor data are captured during automatic control of the vehicle 8, by the camera 1 in the case illustrated. Positions relative to orientation points in the environment of the vehicle 8 are captured on the basis of the captured sensor data and are compared with the trajectory database data. The driving data are generated in this case in such a manner that the control along the trajectory T1, T2 is carried out according to the positions predefined by the trajectory database data.

In the exemplary embodiment, the localization unit 6 of the vehicle 8 also captures localization information. The latter comprises data relating to the current position of the vehicle 8 and/or further information assigned to the current position. The localization information can be used, for example, to determine which of the trajectories T1, T2 is intended to be driven on by the vehicle 8. For example, the localization unit 6 may receive signals from a control device which assigns a particular trajectory T1, T2 to the vehicle 8, for instance, a particular lane, a particular parking space or another local assignment.

In a further exemplary embodiment, the driving data may be generated by the external server 7, in particular on the basis of trajectory database data stored in the external server 7. This can be combined with allocation of a particular trajectory T1, T2 on the basis of localization information, for example, by virtue of the allocation being carried out by the external server 7 and the driving data being transmitted to the vehicle 8.

Exemplary embodiments of the method during use for a parking function are explained with reference to FIGS. 3A to 3F. In this case, the exemplary embodiment of the system, as explained with reference to FIG. 1, and the exemplary embodiment of the method, as explained with reference to FIG. 2, are used as a starting point.

FIGS. 3A to 3F show different situations in which a vehicle can approach a parking space 20. In this case, different trajectories T1, T2 which have a common target position, namely the parking space 20, can typically be driven on. In this case, provision may be made for the trajectories for driving into and driving out of a parking space to be identical or different. Situations are shown in which a parking function of a vehicle 8 is trained by driving on different trajectories T1, T2, the vehicle 8 being controlled in a partially or completely automatic manner. Trajectories can be "learned" on the basis of the trajectory data captured in the process, in particular by generating, storing and/or updating trajectory database data for the trajectories T1, T2 in a trajectory database. Driving data for automatically controlling the vehicle 8 can then be generated on the basis of the trajectory database data. A further vehicle can also be automatically controlled, trajectory database data and/or driving data being transmitted to the further vehicle.

Figure 3A:
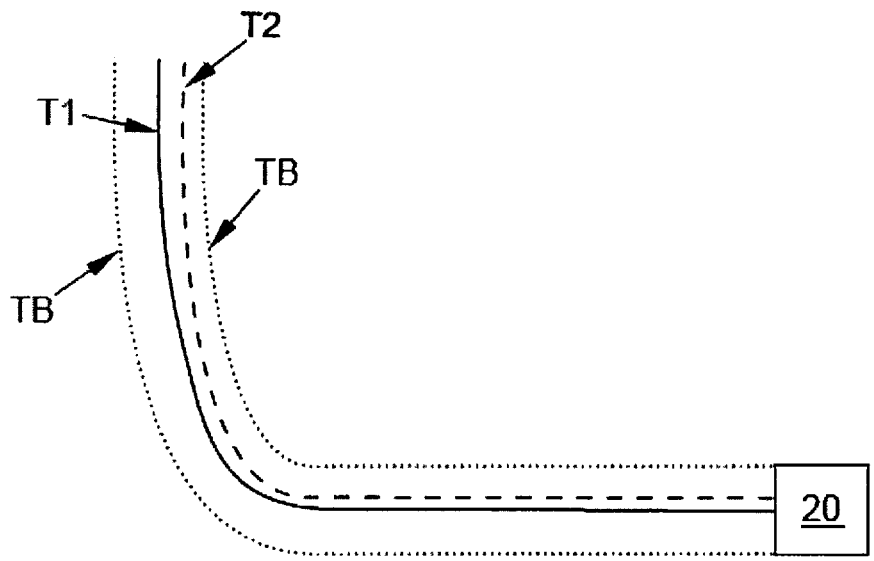
FIGS. 3A to 3F show exemplary embodiments of the disclosed method during use for a parking function.

In the situation shown in FIG. 3A, a drive to a parking space 20 is carried out along a first trajectory T1 and a second trajectory T2. The limits of a tolerance band TB, which runs parallel to the first trajectory T1 at a particular distance, are also indicated. Sections of the second trajectory T2 which are within the tolerance band TB are identified as common sections of the two trajectories T1, T2. This relates to the entire trajectories T1, T2 illustrated.

The exemplary embodiment provides for the trajectory data captured when driving on the trajectories T1, T2 to be merged, that is to say trajectory database data representing information determined along both trajectories T1, T2 are generated. In further exemplary embodiments, an update can be carried out, one of the trajectories T1, T2 being stored and the other being discarded. For example, the trajectory T1, T2 captured last can be stored in this case.

Provision may also be made for the trajectories T1, T2 to have been driven on during an operation of driving into a parking space and driving out of a parking space. In this case, the operation of driving into a parking space can therefore be carried out for the parking space 20 on the basis of the same trajectory T1, T2 as that used for the operation of driving out of a parking space. In further exemplary embodiments, only one of the two operations can be carried out on the basis of both trajectories T1, T2, in which case the direction along which the trajectories T1, T2 were driven on is taken into account when capturing the trajectory data and when generating the trajectory database data.

Figure 3B:
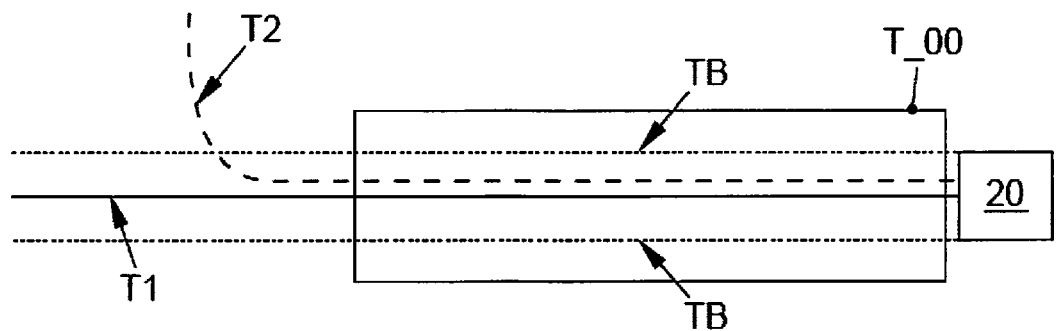

In the situation shown in FIG. 3B, the parking space 20 is the common target position of two partially different trajectories T1, T2. A tolerance band TB parallel to the first trajectory T1 is again illustrated. In this case, it is identified that the trajectories T1, T2 have a common section T_00 in which the trajectories T1, T2 run substantially parallel and are not any further away from one another than indicated by the tolerance band TB. When generating the trajectory database data, a common data structure which comprises the common section T_00 is stored for the trajectories T1, T2. Trajectory data relating to a trajectory T1, T2 can then be retrieved by combining the trajectory database data for different sections and for the common section T_00.

Figure 3C:
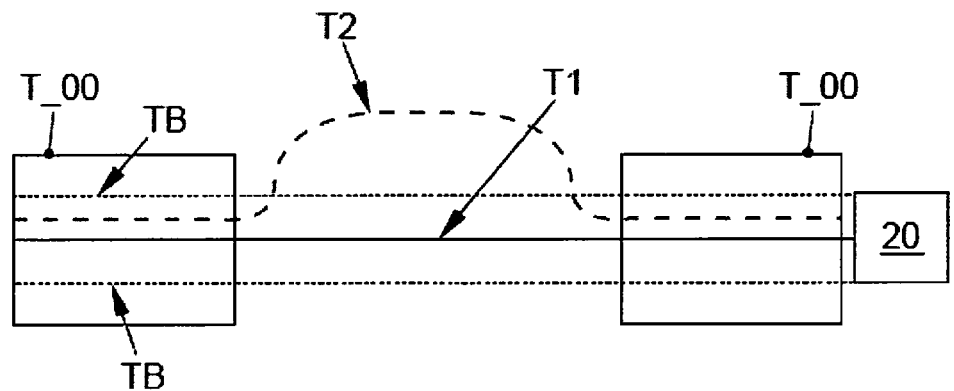

In the situation shown in FIG. 3C, the two trajectories T1, T2 have two common sections T_00 which are interrupted by a different section in which the directions of the trajectories T1, T2 differ greatly from one another and the second trajectory T2 runs at a greater distance from the first trajectory T1 than allowed by the parameter of the width of the tolerance band TB. The common sections T_00 can be stored on the basis of a common data structure when storing the trajectory database data or provision may be made for a separate common data structure to be stored for each contiguous common section T_00.

Figure 3D:
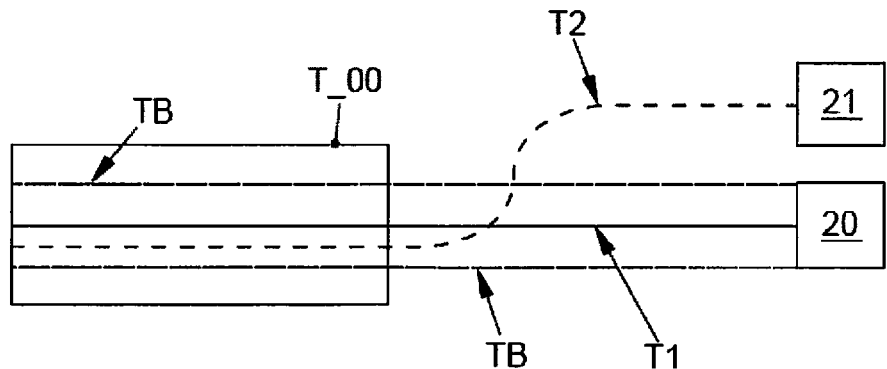

In the situation illustrated in FIG. 3D, provision is made for a further parking space 21 to be able to be approached in addition to the parking space 20. In this case, different trajectories T1, T2 are driven on, the target position of the first trajectory T1 being the parking space 20 and the target position of the second trajectory T2 being the further parking space 21. The trajectories T1, T2 have a common section T_00 which is stored as a common data structure as in the situations illustrated above. This makes it possible to add a further parking space 21, for example, in which case further trajectory database data are stored by the trajectory database.

Figure 3E:
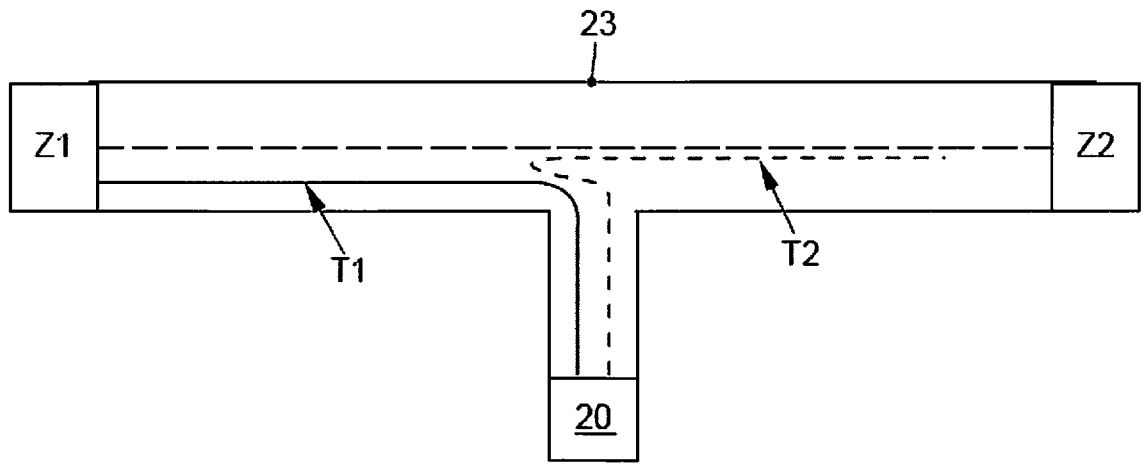

The situation shown in FIG. 3E shows the operation of driving into a parking space and driving out of a parking space for a parking space 20 on a road 23. In this case, the directions of the road 23 are indicated on the basis of a first destination Z1 and a second destination Z2. In this case, a first trajectory T1 is driven on to drive into the parking space 20 coming from the direction of the first destination Z1. A second trajectory T2 is used to drive out of the parking space 20 and to drive along the road 23 in the direction of the second destination Z2.

In this case, the trajectories T1, T2 overlap in a region shortly before the parking space 20 is reached. In this case, the trajectory database data are generated in such a manner that a common data structure is generated and stored for this region.

Figure 3F:
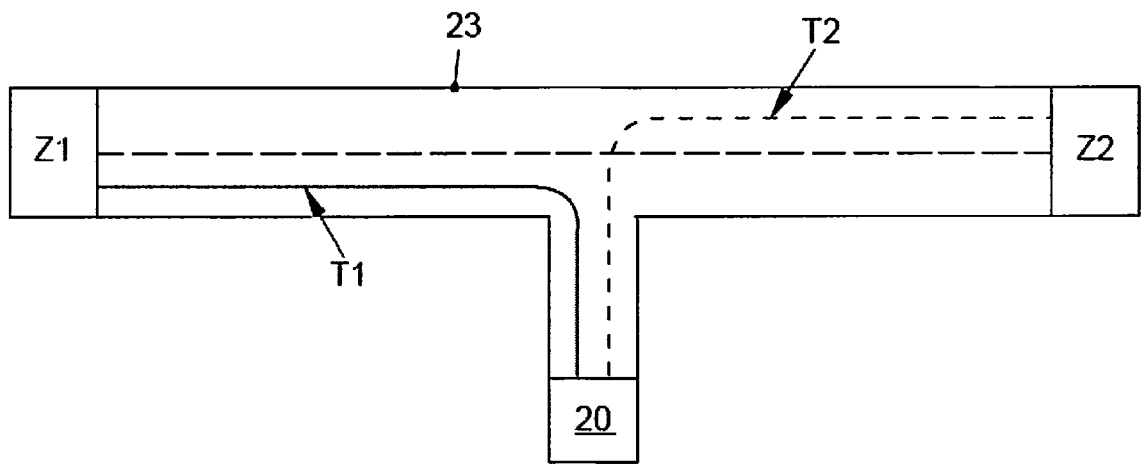

In a similar manner, in the situation shown in FIG. 3F, the parking space 20 is driven on along a first trajectory T1 coming from the direction of the first destination Z1 and a second trajectory T2 is driven on coming from the direction of the second destination Z2 when driving into a parking space. In this case too, the trajectories T1, T2 overlap in a region shortly before the parking space 20 is reached and the trajectory database data can be generated in such a manner that the data relating to this region can be provided by a common data structure for driving into a parking space from the different directions.

Further exemplary embodiments may provide for the parking spaces 20, 21 to be provided in a parking garage, an external server 7 managing the parking spaces 20, 21. In this case, the localization unit 6 can be used, for example, to capture when the vehicle 8 is in the vicinity of one of the parking spaces 20, 21 and the external server can generate driving data and can transmit them to the vehicle 8 in such a manner that the vehicle 8 is automatically controlled to the most favorable parking space 20, 21.

Further exemplary versions may provide for trajectories which are not required to be deleted. In this case, it is possible to capture, for example, when a trajectory was last driven on, how frequently a trajectory is driven on and/or the certainty with which the trajectory data for the trajectory have been captured.

LIST OF REFERENCE SYMBOLS

1 Trajectory capture unit; camera
2 Computing unit
3 Comparison unit
4 Control unit
5 Memory unit
6 Localization unit
7 External server
8 Vehicle
10 Automatic controller
20 Parking space
21 Further parking space
23 Road
P10 to P19 Position along the first trajectory
P20 to P29 Position along the second trajectory
T1 First trajectory
T2 Second trajectory
T_00 Common section
TB Tolerance band
Z1 Destination 1
Z2 Destination 2

The invention claimed is:

1. A method for providing data for a first vehicle trajectory, as a trajectory of a first vehicle, and a second vehicle trajectory, as a trajectory of a second vehicle, the method comprising:
collecting trajectory data of the first and second vehicle trajectories;
generating trajectory database data of the first and second vehicle trajectories based on the collected trajectory data;
storing the trajectory database data in a non-volatile way;
conducting trajectory comparison of the first and second vehicle trajectories based on the collected trajectory data; and
identifying at least one common section of trajectory between the first and second vehicle trajectories based on the trajectory comparison based on the first and second vehicle trajectories,
wherein identifying at least one common section of trajectory between the first and second vehicle trajectories comprises determining trajectory parts of each of the first and second vehicle trajectories, determining a deviation of each one of the trajectory parts of one of the first and second vehicle trajectories relative to a corresponding trajectory part of the other of the first and second vehicle trajectories, and assigning one or more of the trajectory parts and the one or more corresponding trajectory parts to the at least one common section of trajectory based on the respective determined deviation and a deviation threshold value,
wherein the at least one common section of trajectory comprises corresponding ones of the trajectory parts of the first and second vehicle trajectories deviating from each other by no more than the deviation threshold value based on the trajectory comparison,
wherein, when storing the trajectory database data, the at least one common section is stored as a single common data structure of each of the first and second vehicle trajectories, and
wherein, driving data are generated for guiding a transportation vehicle to travel at least one of the first or second vehicle trajectory based on the trajectory database data, and wherein the transportation vehicle is automatically controlled along the first or second vehicle trajectory based on the driving data.

2. The method of claim 1, wherein the collected trajectory data of the first and second vehicle trajectories comprise an organized sequence of positions.

3. The method of claim 2, wherein collecting trajectory data includes capturing the organized sequence of positions relative to orientation points in a physical environment of the first and/or second vehicle trajectory.

4. The method of claim 2, wherein sensor data are collected when capturing the trajectory data of the first and second trajectories, and wherein the organized sequence of positions are determined relative to the orientation points based on the collected sensor data.

5. The method of claim 1, wherein a target position of each of the first and second vehicle trajectories is substantially the same.

6. The method of claim 1, wherein the respective deviation comprises a lateral distance and/or a directional difference between each one of the trajectory parts of one of the first and second vehicle trajectories relative to the corresponding trajectory part of the other of the first and second vehicle trajectories.

7. The method of claim 1, wherein
update data are generated based on the trajectory database data;
the trajectory database is updated based on the update data and trajectory database data.

8. The method of claim 1, wherein
sensor data are captured during automatic control of the transportation vehicle along the first or second vehicle trajectory;
current environmental data are determined based on the sensor data; and
the automatic control of the transportation vehicle along the first or second vehicle trajectory is carried out based on a comparison between the determined current environmental data and the trajectory database data.

9. The method of claim 1, wherein
an item of localization information regarding position of the transportation vehicle relative to at least one of the first and second vehicle trajectories is captured; and
the driving data are generated for following at least one of the first or second vehicle trajectory based on the localization information.

10. The method of claim 1, wherein
the trajectory database data are stored by an external server; and
the driving data are generated by the external server.

11. A system for providing data for a first vehicle trajectory, as a trajectory of a first vehicle, and a second vehicle trajectory, as a trajectory of a second vehicle; the system comprising:
 a trajectory capture device configured for collecting trajectory data of the first and second vehicle trajectories;
 a computing system configured for generating trajectory database data of the first and second vehicle trajectories based on the collected trajectory data and which carries out a trajectory comparison of the first and second vehicle trajectories based on the collected trajectory data;
 a memory device configured for storing the trajectory database data in a non-volatile way,
 wherein a computing unit is configured to identify at least one common section between the first and second vehicle trajectories during the trajectory comparison based on the first and second vehicle trajectories,
 wherein identifying at least one common section between the first and second vehicle trajectories comprises determining trajectory parts of each of the first and second vehicle trajectories, determining a deviation of each one of the trajectory parts of one of the first and second trajectories relative to a corresponding trajectory part of the other of the first and second vehicle trajectories, and assigning one or more of the trajectory parts and the one or more corresponding trajectory parts to the common section based on the respective determined deviation and a deviation threshold value,
 wherein the at least one common section of trajectory comprises corresponding ones of the trajectory parts of the first and second vehicle trajectories deviating from each other by no more than the deviation threshold value based on the trajectory comparison,
 wherein within the trajectory database data, the common section is stored as a single common data structure of each of the first and second vehicle trajectories, and
 wherein driving data is generated guiding a transportation vehicle to travel at least one of the first or second vehicle trajectory based on the trajectory database data; and the transportation vehicle is automatically controlled along the first or second vehicle trajectory based on the driving data.

12. The system of claim 11, wherein the trajectory capture device collects sequence of positions relative to orientation points in a physical environment of the first and/or second vehicle trajectory.

13. The system of claim 11, wherein the memory device is included in an external server.

14. The system of claim 11, wherein the trajectory data of the first and second vehicle trajectories comprise an organized sequence of positions.

15. The system of claim 14, wherein capturing trajectory data includes collecting the organized sequence of positions of the trajectory data relative to orientation points in a physical environment of the first and/or second vehicle trajectory.

16. The system of claim 14, wherein sensor data are collected when collecting the trajectory data of the first and second trajectories, and wherein the organized sequence of positions are determined relative to the orientation points based on the captured sensor data.

17. The system of claim 11, wherein a target position of each of the first and second vehicle trajectories is substantially the same.

18. The system of claim 11, wherein the respective deviation comprises a lateral distance and/or a direction difference between each one of the trajectory parts of one of the first and second vehicle trajectories relative to the corresponding trajectory part of the other of the first and second vehicle trajectories.

19. The system of claim 11, wherein
update data are generated based on the trajectory database data;
a trajectory database is updated based on the update data and trajectory database data.

20. The system of claim 11, wherein
sensor data are captured during automatic control of the vehicle along the first or second trajectory;
current environmental data are determined based on the sensor data; and
the automatic control of the transportation vehicle along the first or second vehicle trajectory is carried out based on a comparison between the determined current environmental data and the trajectory database data.

21. The system of claim 11, wherein
an item of localization information regarding position of the transportation vehicle relative to at least one of the first and second vehicle trajectories is captured; and
the driving data are generated for following at least one of the first or second trajectory vehicle based on the localization information.

22. The system of claim 11, wherein
the trajectory database data are stored by an external server; and
the driving data are generated by the external server.

* * * * *